(12) United States Patent
Lee et al.

(10) Patent No.: US 8,640,520 B2
(45) Date of Patent: Feb. 4, 2014

(54) BENDING DEVICE

(75) Inventors: Mun-Yong Lee, Pusan (KR); Sang-Eon Park, Pusan (KR)

(73) Assignee: Sungwoo Hitech Co., Ltd., Pusan (KR)

( * ) Notice: Subject to any disclaimer, the term of this patent is extended or adjusted under 35 U.S.C. 154(b) by 338 days.

(21) Appl. No.: 12/969,729

(22) Filed: Dec. 16, 2010

(65) Prior Publication Data

US 2011/0155325 A1    Jun. 30, 2011

(30) Foreign Application Priority Data

Dec. 29, 2009  (KR) .......................... 10-2009-0133142

(51) Int. Cl.
*B21D 5/00*   (2006.01)

(52) U.S. Cl.
USPC ................... 72/380; 72/347; 72/386; 72/414

(58) Field of Classification Search
USPC ............. 72/462, 465.1, 466, 466.8, 347, 348, 72/379.2, 380–382, 412, 352, 383, 414, 72/413, 384, 386, 360, 441, 442, 446–448
See application file for complete search history.

(56) References Cited

U.S. PATENT DOCUMENTS

| | | | |
|---|---|---|---|
| 3,474,657 A | * | 10/1969 | Spiegel ........................... 72/478 |
| 4,570,474 A | | 2/1986 | Tanaka |
| 2008/0163660 A1 | * | 7/2008 | Kolbe et al. ....................... 72/52 |

FOREIGN PATENT DOCUMENTS

| | | |
|---|---|---|
| CN | 2688409 Y | 3/2005 |
| CN | 2774670 Y | 4/2006 |
| JP | 56095423 | 8/1981 |
| JP | 60-108115 | 6/1985 |
| JP | 10094832 | 4/1998 |
| JP | 2000-176555 A | 6/2000 |

* cited by examiner

*Primary Examiner* — Dana Ross
*Assistant Examiner* — Pradeep C Battula
(74) *Attorney, Agent, or Firm* — Lexyoume IP Meister, PLLC (57) ABSTRACT

The present invention relates to a bending device of which a beam is inserted between laminated moldings formed by slidably layering a plurality of molding plates, and the bending device of which deformation of the laminated moldings may simultaneously realize bending of up and down directions and side directions of a curved portion of a beam, and thus the bending device may realize a 3-dimensional bending process at once.

15 Claims, 10 Drawing Sheets

BENDING DEVICE

CROSS-REFERENCE TO RELATED APPLICATION

This application claims priority to and the benefit of Korean Patent Application No. 10-2009-0133142 filed in the Korean Intellectual Property Office on Dec. 29, 2009, the entire contents of which are incorporated herein by reference.

BACKGROUND OF THE INVENTION (a) Field of the Invention

The present invention relates to a bending device. More particularly, the present invention relate to a bending device of which a plurality of molding plates are slidably layered and deformation of laminated moldings may realize bending of up and down directions and side directions simultaneously of a curved portion of a beam, and thus the bending device may realize 3-dimensional bending process at once.

(b) Description of the Related Art

Generally, a bumper beam is mounted to a front end of a front side member through a stay, and a center side member is assembled to a rear end of the front side member.

The front side member requires sufficient safety against a vehicle's frontal crash and must be lightweight. Thus, the front side member including an upper member, a lower member, and a support rail is formed by a roll forming process and a bending process.

Figure 1:
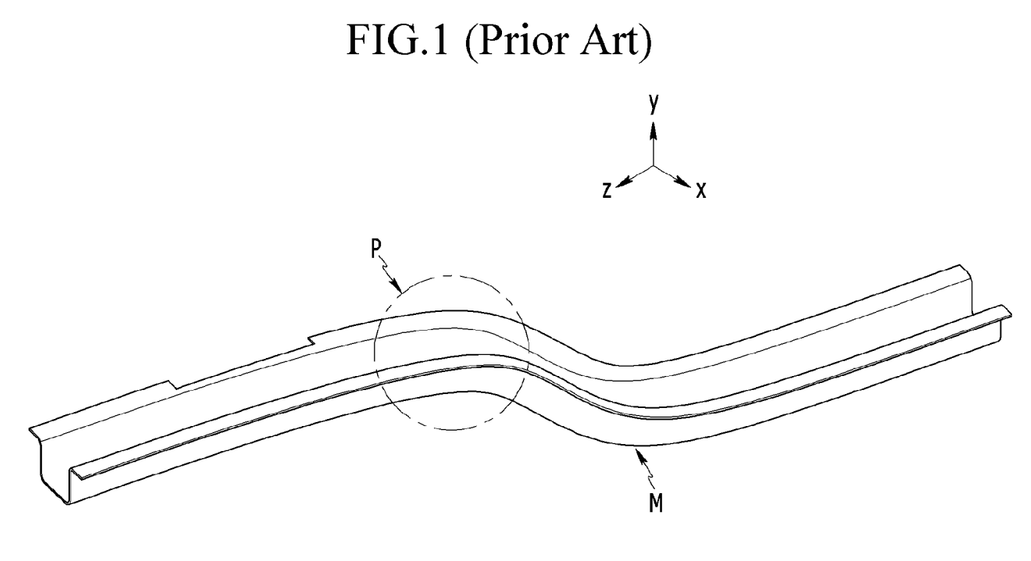
FIG. 1 is a perspective view of a lower member of a front side member formed by a roll-formed beam in a conventional art.
Figure 2:
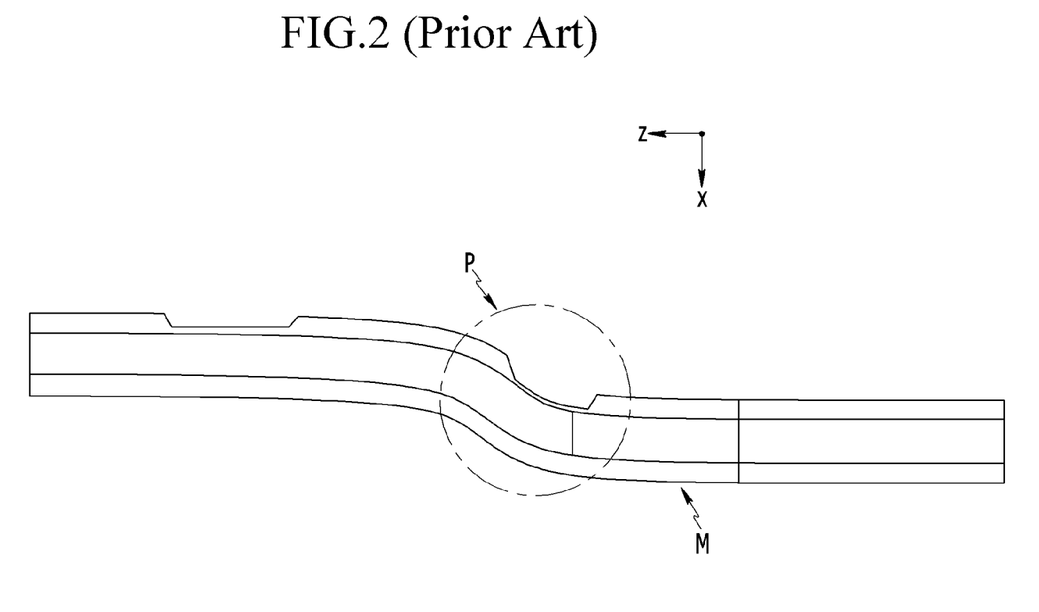
FIG. 2 is a top plan view of a lower member of a front side member formed by a roll-formed beam in a conventional art.

FIG. 1 and FIG. 2 are a perspective view and a top plan view of a lower member of a front side member formed by a roll-formed beam in a conventional art, respectively.

Referring to FIG. 1 and FIG. 2, according to the trend of impact stability and light weight, a lower member M of a front side member requires bending along up and down directions (Y-direction) of a bending portion P and also simultaneously, as shown in FIG. 2, bending in a side direction (X-direction) of the bending portion P. That is, a 3-dimensional bending process is required.

However, in a conventional art, a bending device for processing a 3-dimensional bending process such as for the front side member M does not exist, so a bending process is carried out twice and thus productivity is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a bending device of which a beam is inserted between laminated moldings formed by slidably layering a plurality of molding plates, and in which deformation of the laminated moldings may simultaneously realize bending of up and down directions and side directions of a curved portion of a beam, and thus the bending device may realize a 3-dimensional bending process at once.

A bending device according to an exemplary embodiment of the present invention may include: a die frame of which a mounting space is formed therein; a fixed frame fixed to a side of the die frame; a moving frame movable along a guide rail, which is disposed to a lower portion of the die frame and disposed correspond to the fixed frame; a moving cylinder that is disposed to the other side of the die frame and selectively moves the moving frame toward the fixed frame; fixed and moving laminated moldings including a plurality of molding plates layered between support plates, disposed forward and rearward of the fixed and moving frame, respectively; an arrangement means that arranges the fixed and moving laminated moldings; upper and lower compression moldings disposed corresponding to upper and lower surfaces of the fixed and moving laminated moldings; and pressing cylinders disposed to an upper portion of the fixed frame and the moving frame, respectively, and of which an operating rod is connected to the upper compression moldings, respectively.

An end of an operating rod of the moving cylinder may be connected to the center of the moving frame.

The plurality of molding plates of the fixed laminated molding may be layered to be slidable up and down, respectively, the plurality of molding plates of the moving laminated molding may be layered to be slidable up and down, respectively, a forming groove, curved along up and down directions of a beam, may be formed to one of the fixed laminated molding and the moving laminated molding, and a forming protrusion, curved along up and down directions of a beam, may be formed to the other of the fixed laminated molding and the moving laminated molding corresponding to the forming groove.

The arrangement means may include an arrangement slot formed along up and down directions of the fixed and moving laminated molding, respectively, an arrangement bar inserted into each arrangement slot, and an arrangement cylinder, of which an operating rod is connected to both ends of the arrangement bar, respectively, selectively moves the arrangement bar up and down.

An operating hole may be formed to the support plate respectively corresponding to the arrangement slot of the fixed and moving laminated moldings for the arrangement bar to slide.

A lower surface of the each upper compression molding may be a curved surface curved to a side direction of a beam.

An upper surface of the each lower compression molding may be a curved surface curved to a side direction of a beam.

A bending device according to an exemplary embodiment of the present invention may include: a die frame formed as a "U" shape; a fixed frame fixed to a side of the die frame; a guide rail formed to a lower portion of the die frame; a moving frame, slidable along the guide rail, disposed corresponding to the fixed frame; a moving cylinder that is disposed within the other side of the die frame and selectively moves the moving frame toward the fixed frame; a fixed molding unit, of which a forming groove is formed thereto, which is deformable along up and down directions by a fixed pressing cylinder; and a moving molding unit, of which a forming protrusion is formed thereto, which is deformable along up and down directions by a moving pressing cylinder.

An end of an operating rod of the moving cylinder may be connected to the center of the moving frame.

The fixed molding unit may include: a fixed laminated molding that is formed by a plurality of molding plates, which are layered to be slidable up and down, respectively, and are disposed between support plates and of which an arrangement slot is formed thereto; an arrangement means that arranges the fixed laminated molding along up and down directions through an arrangement bar inserted into the arrangement slot; and a fixed upper and lower compression molding disposed corresponding to upper and lower surfaces of the fixed laminated molding, respectively, wherein an operating rod of the fixed pressing cylinder is connected to the upper compression molding disposed to an upper portion of the fixed frame.

A forming groove, curved along up and down directions of a beam, may be formed to the plurality of molding plates of the fixed laminated molding, and the plurality of molding plates are layered slidable up and down, respectively.

The arrangement means of the fixed molding unit may include an arrangement cylinder that is disposed to a lower portion of the support plates, respectively, and of which an operating rod is connected to both ends of the arrangement bar, respectively.

A lower surface of the fixed upper compression molding may be a curved surface curved to a side direction of a beam.

An upper surface of the fixed lower compression molding may be a curved surface curved to a side direction of a beam.

The moving molding unit may include: a moving laminated molding that is formed by a plurality of molding plates, which are layered to be slidable up and down, respectively, and disposed between support plates, and of which an arrangement slot is formed thereto; an arrangement means that arranges the moving laminated molding along up and down directions through an arrangement bar inserted into the arrangement slot; and moving upper and lower compression moldings disposed corresponding to upper and lower surfaces of the moving laminated molding, respectively, wherein an operating rod of the moving pressing cylinder is connected to the upper compression molding disposed to an upper portion of the moving frame.

A forming protrusion, curved along up and down directions of a beam, may be formed to the plurality of molding plates of the moving laminated molding, and the plurality of molding plates are layered to be slidable up and down, respectively.

The arrangement means of the moving molding unit may include an arrangement cylinder that is disposed to a lower portion of the support plates, respectively, and of which an operating rod is connected to both ends of the arrangement bar, respectively.

A lower surface of the moving upper compression molding may be a curved surface curved to a side direction of a beam.

An upper surface of the moving lower compression molding may be a curved surface curved to a side direction of a beam.

As described above, according to the present invention, the bending device of which a beam is inserted between laminated moldings formed by slidably layering a plurality of molding plates, and in which deformation of the laminated moldings may simultaneously realize bending of up and down directions and side directions of a curved portion of a beam, and thus the bending device may realize a 3-dimensional bending process at once and thus productivity may be improved.

DESCRIPTION OF SYMBOLS

| | |
|---|---|
| 1: bending device | 3: mounting space |
| 5: die frame | 7: fixed frame |
| 9: guide rail | 10: bending beam |
| 11: moving frame | 13: moving cylinder |
| 15: operating rod | 17: support plate |
| 19: operating hole | 21: fixed laminated molding |
| 23: forming groove | 25, 35: arrangement slot |
| 27, 37: arrangement bar | 28, 38: operating rod |
| 29, 39: arrangement cylinder | 31: moving laminated molding |
| 33: forming protrusion | 41: upper compression molding |
| 43: lower compression molding | 51: fixed and pressing cylinders |
| 53: operating rod | |

DETAILED DESCRIPTION OF THE EMBODIMENTS

An exemplary embodiment of the present invention will hereinafter be described in detail with reference to the accompanying drawings.

Figure 3:
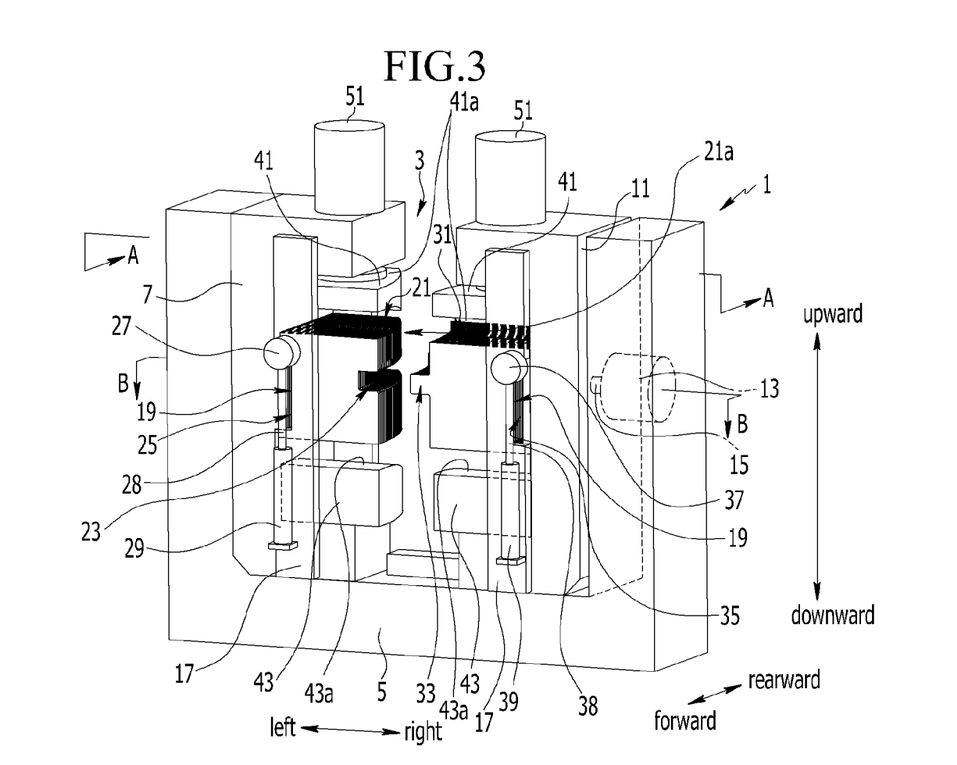
FIG. 3 is a front perspective view of a bending device according to an exemplary embodiment of the present invention.
Figure 4:
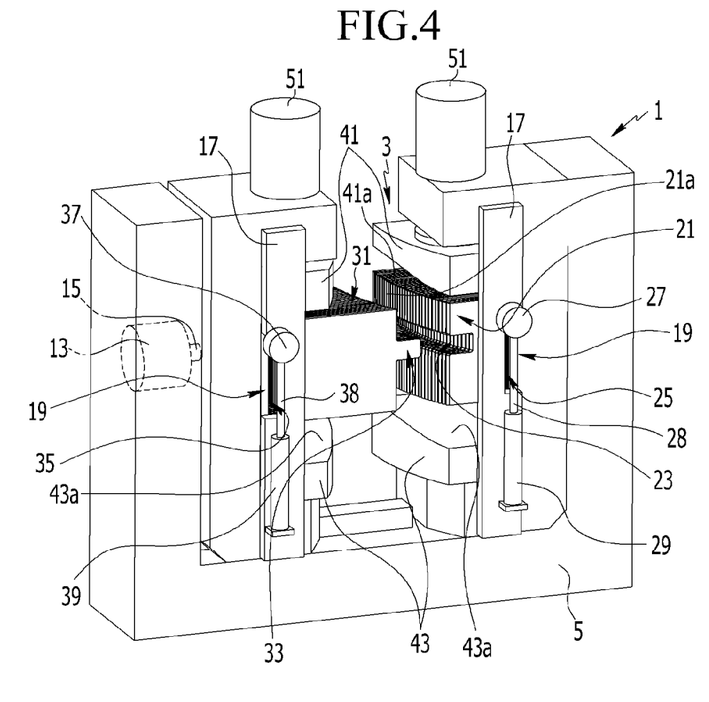
FIG. 4 is a rear perspective view of a bending device according to an exemplary embodiment of the present invention.

FIG. 3 is a front perspective view of a bending device according to an exemplary embodiment of the present invention, and FIG. 4 is a rear perspective view of a bending device according to an exemplary embodiment of the present invention.

For better comprehension, up and down directions, left and right directions, and forward and rearward direction are defined with respect to FIG. 3.

According to an exemplary embodiment of the present, a bending device 1, as shown in FIG. 3 and FIG. 4, includes a die frame 5 of which a mounting space 3 is formed therein. That is, the die frame 5 has a "U" shape.

A fixed frame 7 is fixed to a side of the die frame 5, a guide rail 9 is formed to a lower portion of the die frame 5, and a moving frame 11, slidable along the guide rail 9, is disposed correspond to the fixed frame 7.

A moving cylinder 13 is disposed within the other side of the die frame 5. An end of an operating rod 15 of the moving cylinder 13 is connected to the center of the moving frame 11, and the moving cylinder 13 selectively moves the moving frame 11 toward the fixed frame 7.

Figure 5:
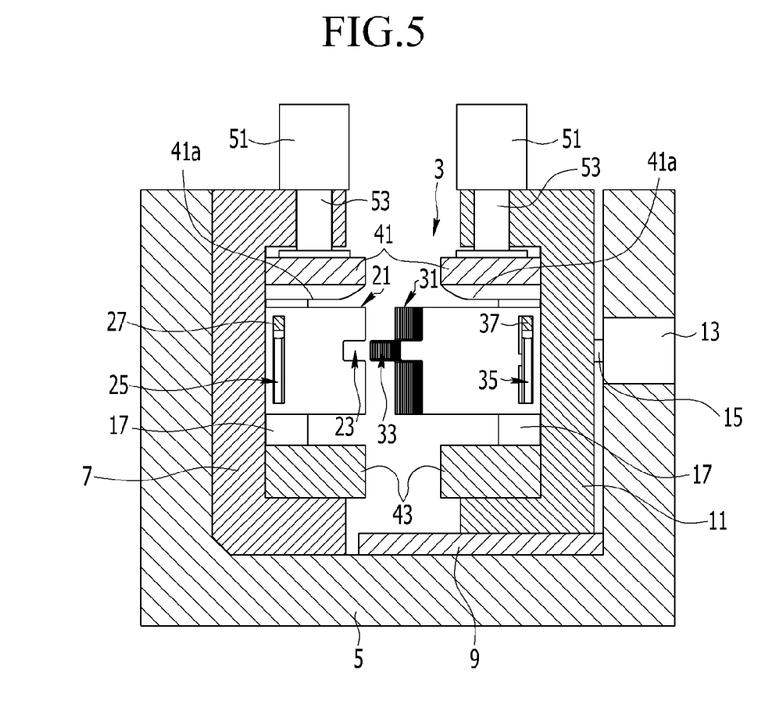
FIG. 5 is a cross-sectional view along line A-A of FIG. 3.
Figure 6:
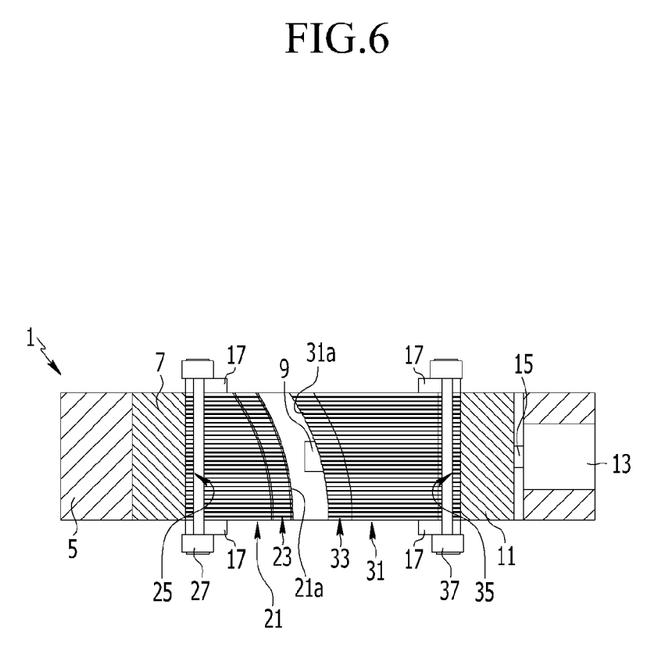
FIG. 6 is a cross-sectional view along line B-B of FIG. 3.

FIG. 5 is a cross-sectional view along line A-A of FIG. 3, and FIG. 6 is a cross-sectional view along line B-B of FIG. 3.

Referring to FIG. 3 to FIG. 6, support plates 17 are disposed at front and rear sides of the fixed frame 7 and the moving frame 11, respectively.

A fixed laminated molding 21, formed by a plurality of layered molding plates, is disposed between the support plates 17.

That is, the fixed laminated molding 21 is formed by layering the plurality of molding plates, which are slidable up and down, respectively.

A forming groove 23 is formed to a surface 21a of the fixed laminated molding 21, which is curved along up and down directions of a beam (referring to FIG. 1, FIG. 2, and FIG. 7), and an arrangement slot 25 is formed along the layered direction.

A fixed arrangement means includes an arrangement bar 27, which is inserted into the arrangement slot 25 of the fixed laminated molding 21, and an arrangement cylinder 29, which is mounted to a lower portion of the support plate 17 disposed to the fixed laminated molding 21, and an operating rod 28 of the arrangement cylinder 29 is connected to both ends of the arrangement bar 27, respectively.

A moving laminated molding 31, formed by a plurality of layered molding plates, is disposed to the moving frame 11.

A forming protrusion 33 is formed to a surface 31*a* of the moving laminated molding 31, which is curved along up and down directions of the beam (referring to FIG. 1, FIG. 2, and FIG. 7), and an arrangement slot 35 is formed along the layered direction.

The forming protrusion 33 of the moving laminated molding 31 may be inserted into the forming groove 23 of the fixed laminated molding 21.

In the drawings, the forming groove 23 is formed to the surface 21*a* of the fixed laminated molding 21 and the forming protrusion 33 is formed to the surface 31*a* of the moving laminated molding 31, however, vice versa is also possible.

A moving arrangement means includes an arrangement bar 37, which is inserted into the arrangement slot 35 of the moving laminated molding 31, and an arrangement cylinder 39, which is mounted to a lower portion of the support plate 17 disposed to the moving laminated molding 31, and an operating rod 38 of the arrangement cylinder 39 is connected to both ends of the arrangement bar 37, respectively.

In the each support plate 17 supporting the fixed and moving laminated moldings 21 and 31 at front and rear sides of the fixed and moving laminated moldings 21 and 31, an operating hole 19 corresponding to the arrangement slots 25 and 35 of the fixed and moving laminated moldings 21 and 31 is formed.

In each of the upper and lower portions of the fixed frame 7 and the moving frame 11, upper and lower compression moldings 41 and 43 corresponding to upper and lower surfaces of the fixed and moving laminated moldings 21 and 31 are respectively disposed.

Figure 7:
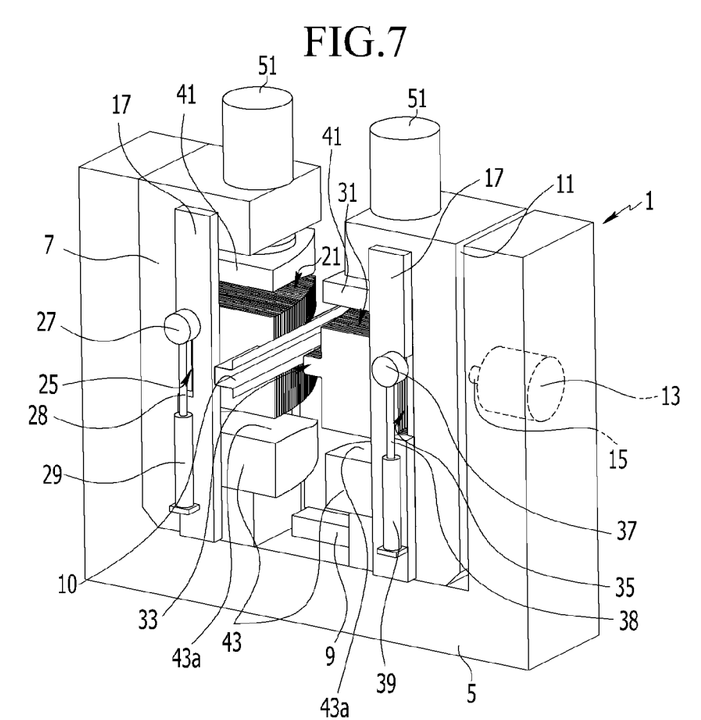
FIG. 7 to FIG. 10 are drawings showing operations of a bending device according to an exemplary embodiment of the present invention.

A lower surface 41*a* of the upper compression molding 41 is a curved surface 41*a* curved to a side direction of the beam (referring to FIG. 1, FIG. 2, and FIG. 7).

An upper surface 43*a* of the lower compression molding 43 is a curved surface 43*a* curved to a side direction of the beam (referring to FIG. 1, FIG. 2, and FIG. 7).

Fixed and moving pressing cylinders 51 are respectively mounted at the upper portion of the fixed frame 7 and the upper portion of the moving frame 11, and an operating rod 53 of each of the fixed and pressing cylinders 51 is connected to an upper compression molding 41, respectively, and selectively moves each upper compression molding 41 downwards.

The fixed laminated molding 21, the fixed arrangement means, and upper and lower compression moldings 41 and 43 form a fixed molding unit, and the moving laminated molding 31, the moving arrangement means, and upper and lower compression moldings 41 and 43 form a moving molding unit.

The fixed molding unit may be deformed in up and down directions by operations of the fixed pressing cylinder 51, and the moving molding unit may be deformed in up and down directions by operations of the moving pressing cylinder 51.

Hereinafter, referring to FIG. 7 to FIG. 10, operations of the bending device according to the exemplary embodiment of the present invention will described.

As shown in FIG. 7, the arrangement cylinders 29 and 39 are operated for the fixed and moving laminated moldings 21 and 31 to be arranged in up and down directions, and the beam 10 that will be bent is inserted into the forming groove 23 of the fixed laminated molding 21.

Figure 8:
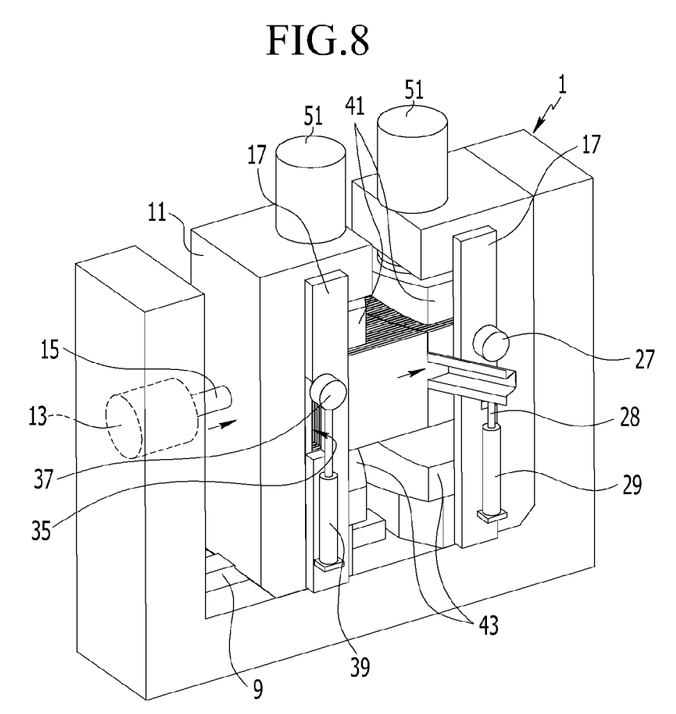

Then, as shown in FIG. 8, the pressing cylinder 13 pushes the moving frame 11 toward the fixed frame 7 such that the fixed laminated molding 21 and the moving laminated molding 31 are combined.

When the fixed laminated molding 21 and the moving laminated molding 31 are combined, the forming protrusion 33 is inserted into the beam 10 that is inserted into the forming groove 23, and thus the beam 10 is bent in up and down directions.

Figure 9:
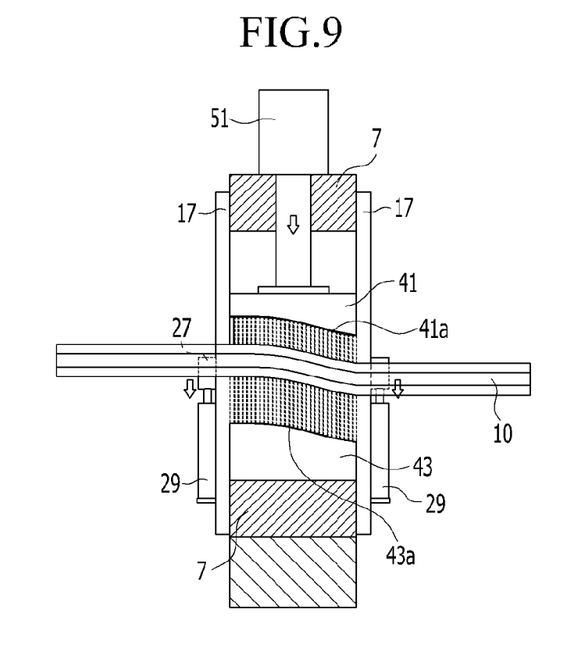

Then, as shown in FIG. 9, the pressing cylinders 51 are operated for the upper compression moldings 41 to move downward, and simultaneously the arrangement cylinders 29 and 39 retreat.

The fixed laminated molding 21 and moving laminated molding 31 are maintained to be combined, and the fixed laminated molding 21 and the moving laminated molding 31 are deformed in up and down directions between the lower surface 41*a* of the upper compression molding 41 and the upper surface 43*a* of the lower compression molding 43 along the curved surfaces 41*a* and 43*a*.

That is, the beam 10 that is inserted between the forming groove 23 and the forming protrusion 33 is bent in up and down directions, and the beam 10 is also bent in a side direction and thus the bending device may realize a 3-dimensional bending process at once.

Figure 10:
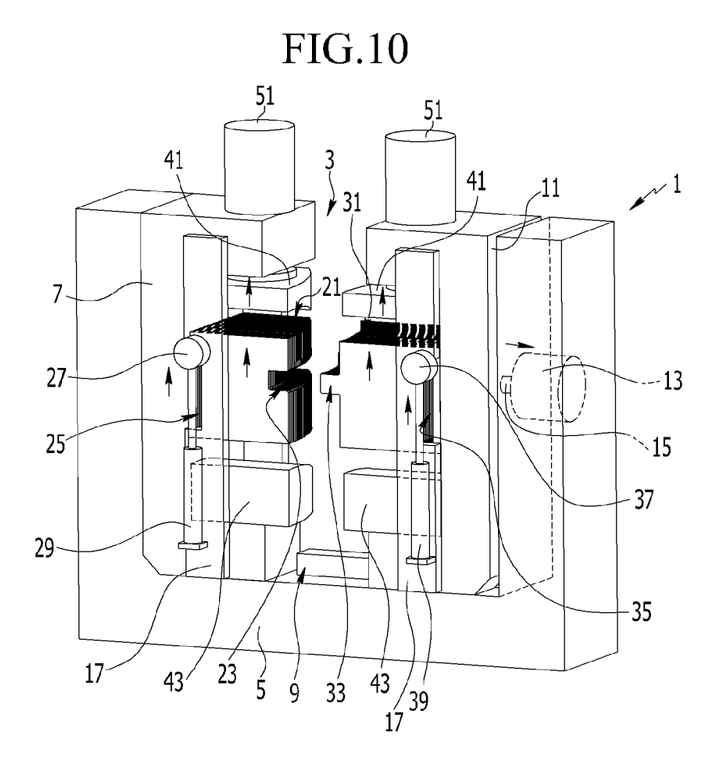

After the straight beam 10 is bent to be the bending beam 10 through the 3-dimensional process, as shown in FIG. 10, the moving cylinder 13 and the pressing cylinder 51 retreat such that the moving frame 11 and the upper compression moldings 41 return to their original positions.

The bending beam 10 that is 3-dimensionally bent is then taken out of the forming groove 23 of the fixed laminated molding 21 and then the arrangement cylinders 29 and 39 advance for the fixed and moving laminated moldings 21 and 31 to return to their original positions.

Thus, return for the next bending process is completed.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A bending device comprising:
a die frame of which a mounting space is formed therein;
a fixed frame fixed to a side of the die frame;
a moving frame movable along a guide rail, which is disposed to a lower portion of the die frame, and disposed corresponding to the fixed frame;
a moving cylinder that is disposed to the other side of the die frame and selectively moves the moving frame toward the fixed frame;
fixed and moving laminated moldings comprising a plurality of molding plates layered between support plates, disposed forward and rearward of the fixed and moving frame, respectively;
an arrangement means that arranges the fixed and moving laminated moldings;
upper and lower compression moldings disposed corresponding to upper and lower surfaces of the fixed and moving laminated moldings; and
pressing cylinders disposed to an upper portion of the fixed frame and the moving frame, respectively, and of which an operating rod is connected to the upper compression moldings, respectively,
wherein:
the plurality of molding plates of the fixed laminated molding are layered to be slidable up and down, respectively; and the plurality of molding plates of the moving laminated molding are layered to be slidable up and down, respectively, wherein the arrangement means comprises:

an arrangement slot formed along up and down directions of the fixed and moving laminated moldings, respectively;

an arrangement bar inserted into each arrangement slot; and an arrangement cylinder, of which an operating rod is connected to both ends of the arrangement bar respectively, selectively moves the arrangement bar up and down.

2. The bending device of claim 1, wherein an end of an operating rod of the moving cylinder is connected to the center of the moving frame.

3. The bending device of claim 1, wherein:

a forming groove, curved along up and down directions of a beam, is formed to one of the fixed laminated molding and the moving laminated molding; and a forming protrusion, curved along up and down directions of a beam, is formed to the other of the fixed laminated molding and the moving laminated molding corresponding to the forming groove.

4. The bending device of claim 1, wherein an operating hole is formed to the support plate respectively corresponding to the arrangement slot of the fixed and moving laminated moldings for the arrangement bar to slide.

5. The bending device of claim 1, wherein a lower surface of the each upper compression molding is a curved surface.

6. The bending device of claim 1, wherein an upper surface of the each lower compression molding is a curved surface.

7. A bending device comprising:

a die frame formed as a "U" shape;

a fixed frame fixed to a side of the die frame;

a guide rail formed to a lower portion of the die frame;

a moving frame, slidable along the guide rail, disposed corresponding to the fixed frame;

a moving cylinder that is disposed within the other side of the die frame and selectively moves the moving frame toward the fixed frame;

a fixed molding unit, of which a forming groove is formed thereto, which is deformable along up and down directions by a fixed pressing cylinder; and a moving molding unit, of which a forming protrusion is formed thereto, which is deformable along up and down directions by a moving pressing cylinder, wherein the fixed molding unit comprises:

a fixed laminated molding that is formed by a plurality of molding plates, which are layered to be slidable up and down, respectively, and are disposed between support plates and of which an arrangement slot is formed thereto;

an arrangement means that arranges the fixed laminated molding along up and down directions through an arrangement bar inserted into the arrangement slot; and fixed upper and lower compression moldings disposed corresponding to upper and lower surfaces of the fixed laminated molding, respectively;

wherein an operating rod of the fixed pressing cylinder is connected to the upper compression molding disposed to an upper portion of the fixed frame, wherein the arrangement means of the fixed molding unit comprises an arrangement cylinder that is disposed to a lower portion of the support plates, respectively, and of which an operating rod is connected to both ends of the arrangement bar, respectively.

8. The bending device of claim 7, further comprising an operating rod of the moving cylinder, wherein an end of the operating rod of the moving cylinder is connected to the center of the moving frame.

9. The bending device of claim 7, wherein a forming groove, curved along up and down directions of a beam, is formed to the plurality of molding plates of the fixed laminated molding, and the plurality of molding plates are layered slidable up and down, respectively.

10. The bending device of claim 7, wherein a lower surface of the fixed upper compression molding is a curved surface.

11. The bending device of claim 7, wherein an upper surface of the fixed lower compression molding is a curved surface.

12. A bending device comprising:

a die frame formed as a "U" shape;

a fixed frame fixed to a side of the die frame;

a guide rail formed to a lower portion of the die frame;

a moving frame, slidable along the guide rail, disposed corresponding to the fixed frame;

a moving cylinder that is disposed within the other side of the die frame and selectively moves the moving frame toward the fixed frame;

a fixed molding unit, of which a forming groove is formed thereto, which is deformable along up and down directions by a fixed pressing cylinder; and a moving molding unit, of which a forming protrusion is formed thereto, which is deformable along up and down directions by a moving pressing cylinder, wherein the moving molding unit comprises:

a moving laminated molding that is formed by a plurality of molding plates, which are layered to be slidable up and down, respectively, and disposed between support plates and of which an arrangement slot is formed thereto;

an arrangement means that arranges the moving laminated molding along up and down directions through an arrangement bar inserted into the arrangement slot; and moving upper and lower compression moldings disposed corresponding to upper and lower surfaces of the moving laminated molding, respectively, wherein an operating rod of the moving pressing cylinder is connected to the upper compression molding disposed to an upper portion of the moving frame, wherein the arrangement means of the moving molding unit comprises an arrangement cylinder that is disposed to a lower portion of the support plates, respectively, and of which an operating rod is connected to both ends of the arrangement bar, respectively.

13. The bending device of claim 12, wherein a forming protrusion, curved along up and down directions of a beam, is formed to the plurality of molding plates of the moving laminated molding, and the plurality of molding plates are layered to be slidable up and down, respectively.

14. The bending device of claim 13, wherein a lower surface of the moving upper compression molding is a curved surface.

15. The bending device of claim 13, wherein an upper surface of the moving lower compression molding is a curved surface.

* * * * *